United States Patent
Macielinski et al.

(10) Patent No.: US 7,616,105 B2
(45) Date of Patent: Nov. 10, 2009

(54) METHODS AND APPARATUS FOR PROVIDING HOURS OF SERVICE MANAGEMENT

(75) Inventors: Damien Macielinski, Tualatin, OR (US); Chris Robison, Portland, OR (US); Kristin W. Peri, Portland, OR (US); Tim Bishopric, Portland, OR (US)

(73) Assignee: QUALCOMM Incorporated, San Diego, CA (US)

( * ) Notice: Subject to any disclaimer, the term of this patent is extended or adjusted under 35 U.S.C. 154(b) by 306 days.

(21) Appl. No.: 11/370,600

(22) Filed: Mar. 7, 2006

(65) Prior Publication Data

US 2007/0210904 A1 Sep. 13, 2007

(51) Int. Cl.
*B60Q 1/00* (2006.01)
*G09F 9/00* (2006.01)
(52) U.S. Cl. .................. 340/439; 340/438; 340/461; 701/29
(58) Field of Classification Search .................. 340/439, 340/438
See application file for complete search history.

(56) References Cited

U.S. PATENT DOCUMENTS 6,317,668 B1 11/2001 Thibault 6,526,341 B1 * 2/2003 Bird et al. .................. 701/35
7,212,829 B1 * 5/2007 Lau et al. ................. 455/456.1

FOREIGN PATENT DOCUMENTS

DE 19533515 A1 3/1997
DE 10056756 A1 5/2002

OTHER PUBLICATIONS

International Search Report - PCT/US07/063518 - International Search Authority, European Patent Office, Jul. 19, 2007.
Written Opinion - PCT/US07/063518 - International Search Authority, European Patent Office, Jul. 19, 2007.
International Preliminary Report on Patentability - PCT/US07/063518 - The International Bureau of WIPO, Geneva, Switzerland - Sep. 9, 2008.

* cited by examiner

*Primary Examiner*—Donnie L Crosland
(74) *Attorney, Agent, or Firm*—Richard A. Bachand; Ashish L. Patel (57) ABSTRACT

Methods and apparatus for providing hours of service management. A method is provided that operates to provide advisements to a vehicle operator. The method includes receiving a status message in a transmission from a vehicle, wherein the status message comprises a status parameter, and determining a compliance indicator associated with the status parameter, wherein the compliance indicator is selected from confirmation, violation, and threshold indicators. The method also includes generating an advisement message based on the compliance indicator, and transmitting the advisement message to the vehicle.

39 Claims, 7 Drawing Sheets

METHODS AND APPARATUS FOR PROVIDING HOURS OF SERVICE MANAGEMENT

BACKGROUND

I. Field

Embodiments of the present invention relate generally to the operation of transportation and delivery vehicles, and more particularly, to methods and apparatus for providing hours of service management for operators and administrators of delivery vehicles.

II. Description of the Related Art

Advances in technology have provided for increased automation in many industries. For example, in the shipping industry, technology has allowed for the shipment and delivery of cargo virtually around the clock. Delivery vehicles now carry and deliver cargo to all parts of the country. For example, in the trucking industry, cargo-carrying tractor-trailers may be driven hundreds or thousands of miles to reach a delivery site. In some cases, a delivery vehicle may make several intermediate stops before reaching its final destination. Unfortunately, extensive delivery schedules place a huge burden on vehicle operators. Thus, it has become increasingly important to efficiently manage the hours of service performed by vehicle operators.

Typically, the hours that a vehicle operator may operate a vehicle are regulated by state and federal agencies. For example, the Department of Transportation (DOT) and the Federal Highway Administration (FHWA) have adopted regulations that limit the number of hours that a vehicle operator may operate a vehicle over a given time period. For example, the regulations cover how long an operator may operate a vehicle in a day and over a sixty hour time period. The regulations also cover the amount of rest time a vehicle operator needs to have. To ensure compliance with the regulations, vehicle operators are required to maintain logbooks, which may be periodically inspected for compliance.

Unfortunately, compliance with the regulations is for the most part based on the ability of the vehicle operator to understand the regulations and maintain the required logs. New and/or relatively young vehicle operators may not fully understand all aspects of the regulations, or may be prone to mistakes with regards to maintaining the logs or complying with the regulations. Furthermore, vehicle operators may not understand how the regulations impact the delivery schedule or load planning associated with the vehicle. For example, by failing to take long enough rest breaks, the operation of the vehicle may be limited on the following day. Thus, the intelligence, experience, and diligence of the vehicle operator determine not only the compliance with the safety regulations, but the load planning and efficient use of the delivery vehicle.

Therefore, it would be desirable to have a system that not only assists a vehicle operator to comply with the safety regulations, but also operates to advise the vehicle operator about the impact of specific actions with regards to the planning and efficient use of the delivery vehicle. For example, the system should operate to advise a vehicle operator whether or not a specific action is desirable based on the history of the vehicle operator's actions and/or the load planning, efficiency, or requirements of a particular delivery schedule.

SUMMARY

In one or more embodiments, an advisement system, comprising methods and apparatus, is provided that operates to advise vehicle operators about potential regulation compliance failures. The system also operates to advise vehicle operators about the impact of a particular action on regulation compliance, load planning, efficiency, or other requirements of a particular delivery vehicle. As a result, the system operates to assist vehicle operators, especially young or inexperienced operators, to comply with existing safety regulations and make operational decisions that support the safe and efficient operation of a particular delivery vehicle.

In one embodiment, a method is provided that operates to provide advisements to a vehicle operator. The method comprises receiving a status message in a transmission from a vehicle, wherein the status message comprises a status parameter, and determining a compliance indicator associated with the status parameter, wherein the compliance indicator is selected from confirmation, violation, and threshold indicators. The method also comprises generating an advisement message based on the compliance indicator, and transmitting the advisement message to the vehicle.

In another embodiment, apparatus is provided that operates to provide advisements to a vehicle operator. The apparatus comprises receiving logic configured to receive a status message in a transmission from a vehicle, wherein the status message comprises a status parameter, and a rules engine configured to determine a compliance indicator associated with the status parameter, wherein the compliance indicator is selected from confirmation, violation, and threshold indicators. The apparatus also comprises an advisement processor configured to generate an advisement message based on the compliance indicator, and transmitting logic configured to transmit the advisement message to the vehicle.

In another embodiment, an apparatus is provided that operates to provide advisements to a vehicle operator. The apparatus comprises means for receiving a status message in a transmission from a vehicle, wherein the status message comprises a status parameter, and means for determining a compliance indicator associated with the status parameter, wherein the compliance indicator is selected from confirmation, violation, and threshold indicators. The apparatus also comprises means for generating an advisement message based on the compliance indicator, and means for transmitting the advisement message to the vehicle.

In another embodiment, a computer-readable media is provided that comprises instructions, which when executed by at least one processor, provide advisements to a vehicle operator. The computer-readable media comprises instructions for receiving a status message in a transmission from a vehicle, wherein the status message comprises a status parameter, and instructions for determining a compliance indicator associated with the status parameter, wherein the compliance indicator is selected from confirmation, violation, and threshold indicators. The computer-readable media also comprises instructions for generating an advisement message based on the compliance indicator, and instructions for transmitting the advisement message to the vehicle.

In one embodiment, at least one processor is provided that is configured to perform a method for providing advisements to a vehicle operator. The method comprises receiving a status message in a transmission from a vehicle, wherein the status message comprises a status parameter, and determining a compliance indicator associated with the status parameter, wherein the compliance indicator is selected from confirmation, violation, and threshold indicators. The method also comprises generating an advisement message based on the compliance indicator, and transmitting the advisement message to the vehicle.

In one embodiment, a method is provided that operates to provide advisements to a vehicle operator. The method comprises obtaining a status parameter, and determining a compliance indicator associated with the status parameter, wherein the compliance indicator is selected from confirmation, violation, and threshold indicators. The method also comprises generating an advisement message based on the compliance indicator, and displaying the advisement message.

Other aspects of the embodiments will become apparent after review of the hereinafter set forth Brief Description of the Drawings, Detailed Description, and the Claims.

BRIEF DESCRIPTION OF THE DRAWINGS

The foregoing aspects of the embodiments described herein will become more readily apparent by reference to the following detailed description when taken in conjunction with the accompanying drawings wherein.

DETAILED DESCRIPTION

The following detailed description describes methods and apparatus for providing an advisement system that operates to advise vehicle operators about the impact of a particular action on regulation compliance, load planning, efficiency, or other requirements of a particular delivery vehicle. It should also be understood that embodiments of the advisement system could be used in conjunction with virtually any type of delivery vehicle including, but not limited to, trucks, buses, trains, aircraft, and automobiles.

Figure 1:
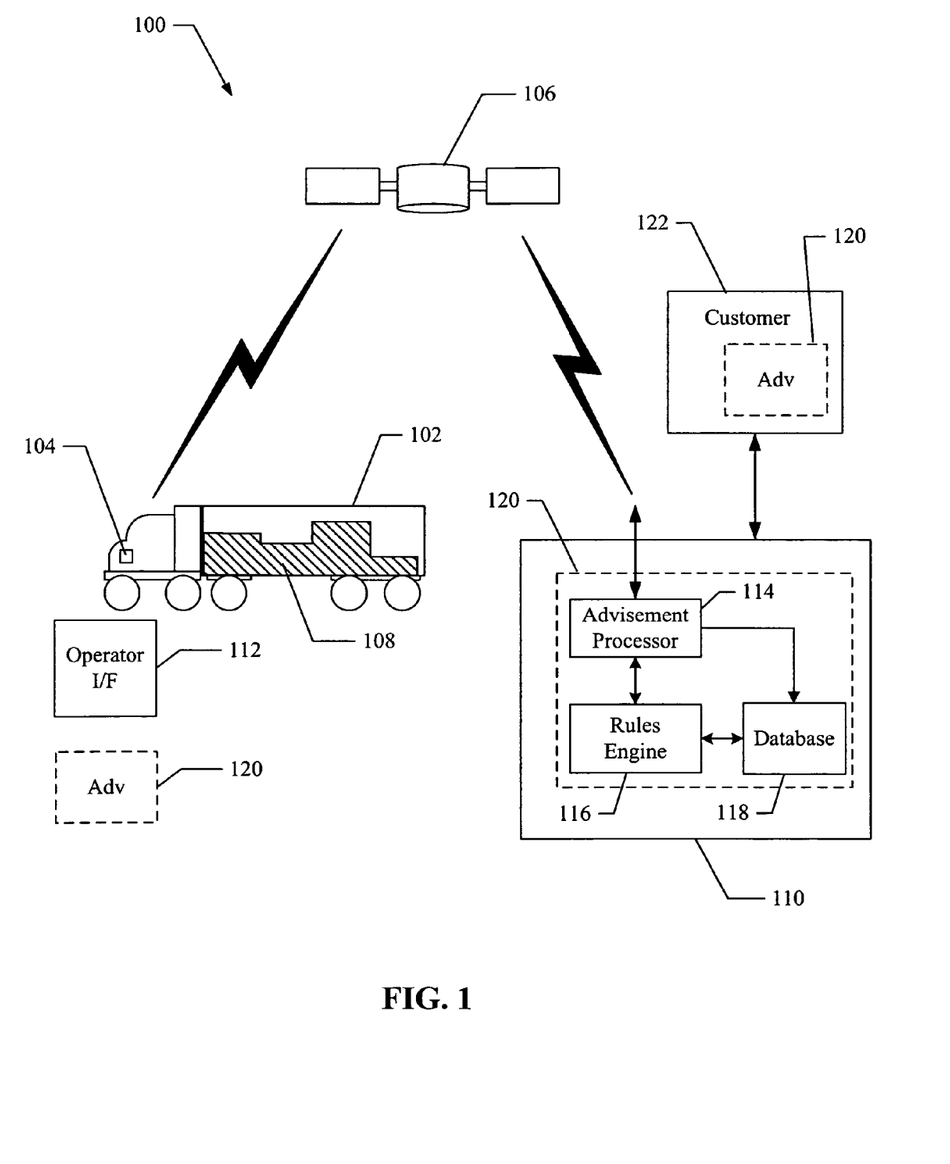
FIG. 1 shows one embodiment of an advisement system for advising an operator of a delivery vehicle.

FIG. 1 shows one embodiment of an advisement system 100 for advising an operator of a delivery vehicle 102. The vehicle 102 in this example comprises a tractor-trailer, commonly used in the long-haul trucking industry to transport goods from shippers to consignees. The vehicle 102 comprises a mobile communication terminal (MCT) 104 for communicating with one or more remote locations using a satellite-based wireless communication system and satellite 106. The communication system provides two-way communications between delivery vehicles and third parties, such as a fleet management center (FMC), network management center, dispatch center, customers, family members, governmental authorities, consignees, shippers, or other remote stations. Generally, the MCT 104 resides onboard a tractor portion of the vehicle 100 so as to be easily accessible by the vehicle operator. The trailer portion of the vehicle 102 includes cargo 108 to be delivered to one or more delivery sites.

In one embodiment, a remote station 110 comprises a central processing center, otherwise known as a central station, hub, or network management center (NMC), and serves as a central communication point between MCT-equipped vehicles and their respective dispatch centers, other designated office(s), shippers, consignees, governmental authorities, family members, and so on.

The MCT 104 located on the vehicle 102 transmits and receives wireless communications using the satellite-based wireless communication system to communicate with the remote station 110. Other wireless systems could be used in addition or in the alternative, such as an analog or a digital cellular telephone system, an RF communication system, a wireless data communication network, such as a cellular digital packet data (CDPD) network, or 802.11 and/or Bluetooth technologies. Thus, it is possible for information obtained at the vehicle 102 to be transmitted to one or more entities using the satellite-based wireless communication system or suitable alternative system.

The vehicle 102 comprises an operator interface (I/F) 112 that is located in the tractor portion of the vehicle. During operation, the interface 112 receives operator and vehicle inputs and communicates this information to the remote station 110 through the satellite 106. Additionally, information from the remote station 110 is communicated back to the operator I/F 112 through the satellite 106 for rendering and/or display to the operator.

In one embodiment, the remote station 110 includes advisement logic 120 that comprises advisement processor 114, a rules engine 116, and a database 118. The advisement processor 114 operates to receive status messages from the vehicle 102 that include status indicators that describe the vehicle operator's status, a change in status, proposed actions, and/or other operator information, vehicle information, or parameters. For example, the operator's status may indicate a status selected from the following sample list of operators status options.

1. Driving
2. On-duty not driving
3. Sleeper birth
4. Off duty

The advisement processor 114 operates to store all or portions of the information in the status messages in the database 118 to form a duty status file that comprises a history of the operator's activities. The rules engine 116 operates to apply safety rules and regulations to the information received from the vehicle. For example, the rules engine 116 obtains history information from the duty status file in the database 118 to determine if a proposed action (i.e., change of status) by the vehicle operator will comply with or violate one or more safety regulations. The results of the operation of the rules engine 116 are provided to the advisement processor 114.

The advisement processor 114 operates to generate advisement information that is transmitted through the satellite 106 to the operator I/F 112. The advisement information comprises confirmations regarding proposed operator actions, warnings about rules violations, advisements about the impact of a proposed action, recommendations for future actions, and/or any other type of advisement that would assist the vehicle operator to safely and efficiently operate the vehicle. For example, the operator may enter information into the operator I/F 112 that indicates that the operator is proposing to end a break period and begin operating the vehicle. That information is transmitted to the advisement logic 120 in a status message. The advisement processor 114 then activates the rules engine 116 to determine whether such an action would violate any known regulation or prevent a reset that would harm driver efficiency. The rules engine 116 accesses the database 118 to evaluate the history of the operator's work log over some selected time interval. The rules engine 116 then outputs its results to the advisement processor 114. The advisement processor 114 then generates advisement messages that are transmitted to the vehicle 102 for display to the operator through the operator I/F 112. For example, the advisement processor 114 may also determine one or more advisements to transmit to the operator regardless of whether or not the proposed action would violate any safety regulation. The advisement messages may advise the vehicle operator whether it is allowable under the existing regulations to operate the vehicle at this time. The advisement messages may also advise the operation about actions that will result in more efficient delivery of the cargo. For example, it may be desirable to advise the operator to continue on the current break period for an additional time so that the operator will then be able to operate the vehicle long enough on the following day to reach a delivery destination without having to take additional breaks.

In one embodiment, the advisement processor 114 determines the impact of a proposed operator action on the compliance, load planning, efficiency, or other requirements of the delivery vehicle 102. For example, if the proposed operator action would adversely impact the operator's ability to efficiently complete the delivery route, then the advisement processor 114 would generate the appropriate advisements to transmit back to the vehicle 102.

It should also be noted that the advisement logic 120 is not restricted to operation at the remote station 110. For example, in one embodiment, the advisement logic 120 is located at a customer site 122 that is in communication with the remote station 110. In another embodiment, the advisement logic 120 is located at the vehicle 102. As a result, embodiments of the advisement logic 120 may be located at any of several locations to provide the functions of the advisement system described herein.

Thus, the advisement system 100 operates to provide compliance information to vehicle operators so that they are able to comply with existing regulations. Furthermore, the advisement system 100 provides advisements that may guide a vehicle operator to more efficient operation of the vehicle along its delivery route.

Figure 2:
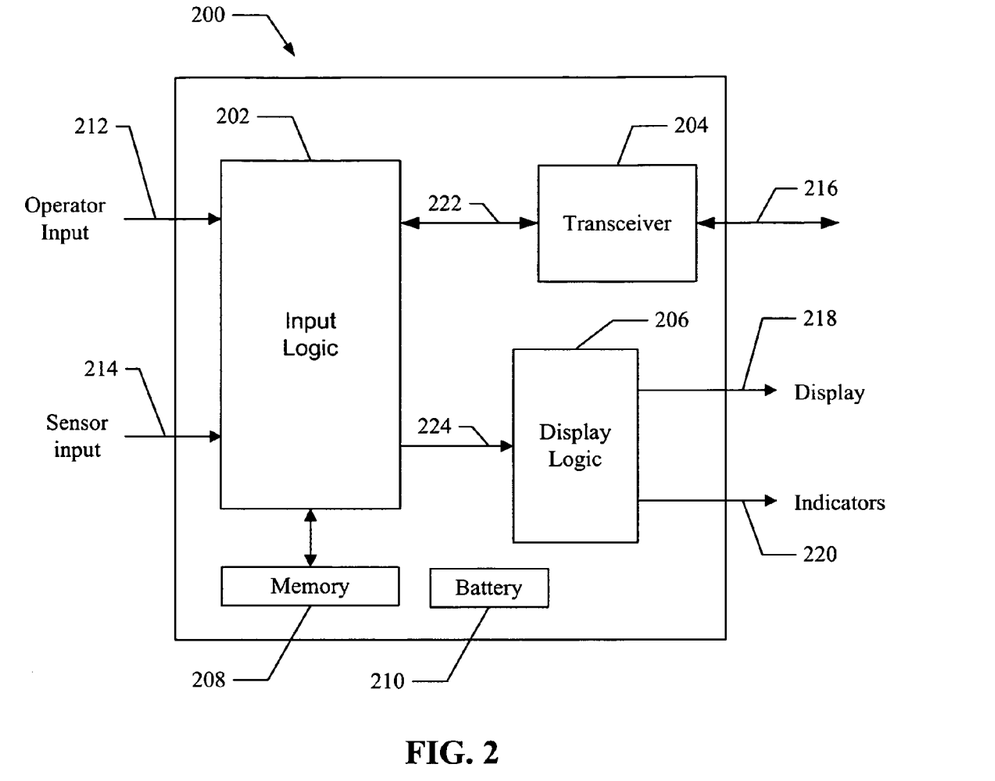
FIG. 2 shows a detailed diagram of one embodiment of an operator I/F suitable for use in one or more embodiments of an advisement system.

FIG. 2 shows a detailed diagram of one embodiment of an operator I/F 200 suitable for use in one or more embodiments of an advisement system. For example, the operator I/F 200 may be used as the operator I/F 112 shown in FIG. 1.

The operator I/F 200 comprises input logic 202, transceiver logic 204, display logic 206, a memory 208, and a battery 210. It should be noted that the operator I/F 200 represents just one implementation and that other implementations are possible within the scope of the embodiments.

In one embodiment, the transceiver 204 comprises any suitable logic configured to communicate using any type of wireless and/or wired communication technology so that messages may be passed from the operator I/F 200 to a central station. For example, the transceiver 204 may comprise wireless communication logic allowing the transceiver 204 to communicate with a satellite thereby providing two-way communication with a remote central station. The transceiver also includes logic configured to receive messages passed from the input logic 202 through the connection 222. As a result, messages received from the input logic 202 through the connection 222 may be transmitted to a remote station.

The display logic 206 comprises any suitable logic configured to render information on local display systems. For example, the display logic 206 outputs local messages to a vehicle display over the connection 218. The vehicle display is suitable for displaying any type of text, image, sound or speech to the vehicle operator. The display logic 206 also outputs control signals on the connection 220 that are used to activate and de-activate local indicators such as lights, audible alarms, or any other local vehicle indicator. Additionally, the display logic includes logic configured to receive messages passed from the input logic 202 through the connection 224. As a result, messages received from the input logic 202 through the connection 224 may be used to display text messages to the vehicle operator and/or activate/deactivate any type of vehicle indicator.

The input logic 202 comprises a processor, gate array, CPU, discrete hardware, logic, memory elements, virtual machine, software and/or any combination of hardware and software. Thus, the input logic 202 generally comprises logic to execute machine-readable instructions and to control one or more functional elements of the operator I/F 200.

The input logic 202 is configured to receive operator inputs at input 212 and vehicle sensor inputs at input 214. For example, the operator inputs comprise inputs received from a keypad, keyboard, touch screen, remote control, vehicle dashboard buttons or switches, or inputs from any other type of user actuated input device. The vehicle sensor inputs comprise inputs from one or more vehicle sensors, such as an engine sensor, ignition sensor, battery sensor, door sensor, cargo sensor, or any other type of vehicle related sensor, such as a position sensor or temperature sensor.

The input logic 202 processes the received operator and vehicle inputs to generate operator status messages that are passed to the transceiver logic 204 through the connection 222. The input logic 202 is also configured to receive advisements messages from the transceiver logic through the connection 222. The advisement messages may be transmitted from a remote station in response to the status messages. In one embodiment, the advisement messages comprise information for display or rendering at the vehicle.

The input logic 202 is configured to transmit display messages to the display logic 206 through the connection 224. For example, in one embodiment, the input logic 202 processes any received advisement messages to generate the display messages. The display messages include information or commands that cause the display logic 206 to activate visual indicators, display text messages, or render any other type of information to the vehicle operator. The input logic 202 also comprises a connection to the memory 208 so that any information processed by the input logic 202 may be stored in the memory 208 for later processing if necessary. The memory 208 comprises any suitable type of memory storage device such as a hard disk, RAM, Flash memory, or any other suitable memory storage device.

The battery 210 is optionally provided and may be used to power the operator I/F 200 when in a stand-alone mode. For example the operator I/F 200 may operate when the vehicle in which it resides is not running. In this case, the battery 210 provides power to the operator I/F 200 so that the system continues to operate thereby allowing the vehicle operator to enter inputs and receive advisement messages. The battery 210 also operates to provide power to the transceiver 204 so that communications with a remote station may continue when the vehicle is not an operation.

In one embodiment, the advisement system comprises program instructions stored on a computer-readable media, which when executed by at least one processor, for example, at the input logic 202, provides the functions as described herein. For example, instructions may be loaded into the processor from a computer-readable media, such as a floppy disk, CDROM, memory card, FLASH memory device, RAM, ROM, or any other type of memory device or computer-readable media. In another embodiment, the instructions may be downloaded into the processor from a network resource through the transceiver logic 204. The instructions, when executed by the at least one processor, provide one or more embodiments of an advisement system as described herein.

Figure 3:
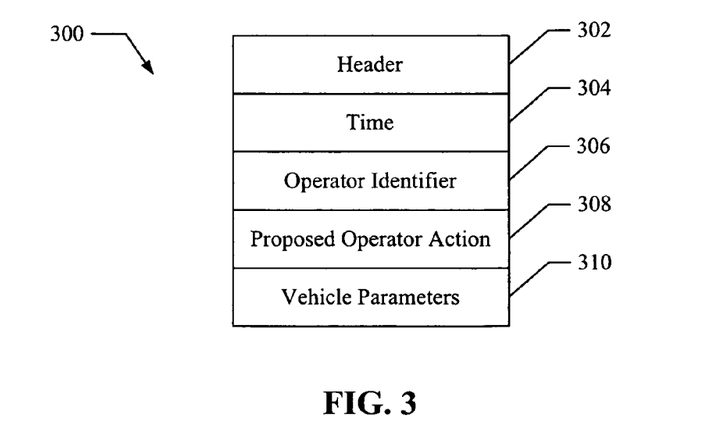
FIG. 3 shows one embodiment of a status message suitable for use in one or more embodiments of an advisement system.

FIG. 3 shows one embodiment of a status message 300 suitable for use in one or more embodiments of an advisement system. The status message 300 comprises a header 302, a time indicator 304, an operator identifier 306, proposed operator action 308, and one or more vehicle parameters 310. Thus, the message 300 comprises one or more status parameters that comprise operator actions and/or vehicle parameters. In one embodiment, the vehicle parameters comprise one or more trip parameters that describe the trip that the vehicle is currently on or proposes to take.

In one embodiment, the header 302 identifies the message as a status message. However, the header 302 may be used to provide any other suitable type of header information. The time indicator 304 indicates a time when the status message was created or transmitted. For example, in one embodiment, the time indicator comprises time based on a global time standard. The operator identifier 306 identifies the operator that is associated with the status message 300. For example, the operator identifier 306 may be an operator ID number that uniquely identifies the operator.

In one embodiment, the proposed operator action 308 comprises a macro message that indicates an action that the operator desires to take. For example, the action may be to go on-duty, go off-duty, enter the sleeper birth, or any other suitable operator action. The macro messages comprise preformatted abbreviated messages that can be quickly interpreted by any processing logic in the advisement system. However, any suitable message structure may be used to identify the operator actions 308.

The vehicle parameters 310 comprise one or more parameters that are derived from the vehicle. For example, the vehicle parameters may include, but are not limited to, engine parameters, load parameters, location parameters, or any other type of vehicle parameters.

In one embodiment, the input logic 202 generates the status message 300 in response to input received from the operator through the operator input 212, and/or vehicle sensor inputs received through the sensor input 214. It should be noted that the status message 300 is just one implementation and that other implementations are possible within the scope of the embodiments.

Figure 4:
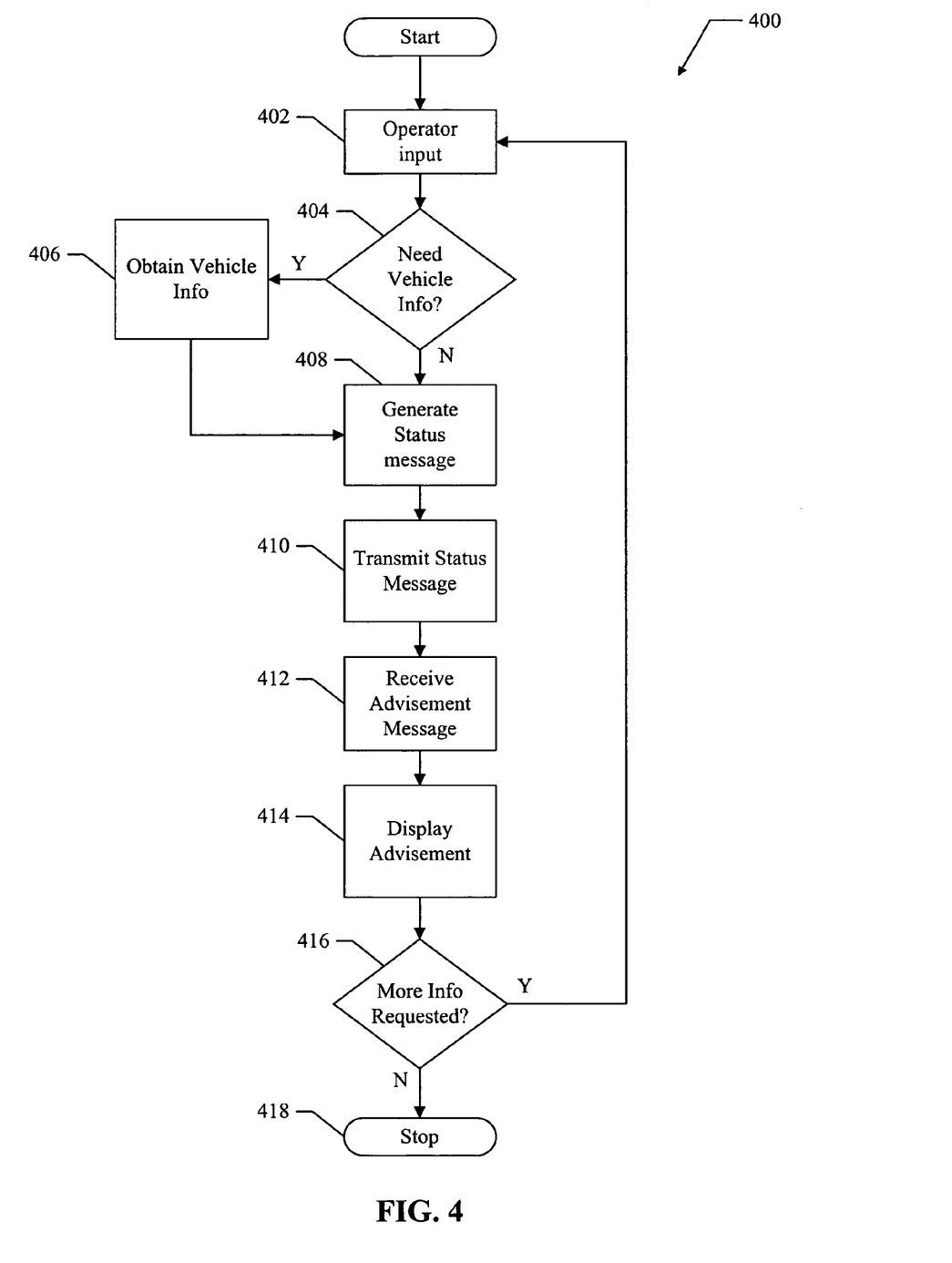
FIG. 4 shows one embodiment of a method for providing one embodiment of an advisement system.

FIG. 4 shows one embodiment of a method 400 for providing one embodiment of an advisement system. For example, the method 400 is suitable for use with the operator I/F 200 shown in FIG. 2. For clarity, the method 400 is described below with reference to the operator I/F 200. In one embodiment, the input logic 202 executes machine-readable instructions to control the operator I/F 200 to perform the functions described below.

At block 402, operator information is received. For example, a vehicle operator inputs operator information into the input logic 202 through the operator input 212. The operator information comprises an operator identifier, proposed operator action, time, and/or any other suitable information.

At block 404, a test is performed to determine if any vehicle parameters are required to assemble a status message based on the operator input at block 402. For example, information from the vehicle, such as the position of the vehicle may be needed so that it can be associated with the operator information to generate a status message. If more vehicle information is needed, the method proceeds to block 406. If no vehicle information is needed, the method proceeds to block 408.

At block 406, vehicle information is obtained. In one embodiment, the input logic 202 obtains the vehicle information through the sensor input 214. Any suitable vehicle information may be obtained to generate a status message. For example, the input logic 202 may obtain a position of the vehicle from a position sensor that communicates with the input logic 202 through the sensor input 214.

At block 408, one or more status messages are generated. For example, the status messages comprise the operator input and any vehicle input. In one embodiment, the input logic 202 generates one or more status messages that are formatted as shown in FIG. 3.

At block 410, the status message is transmitted to a remote station. For example, in one embodiment, the status message is transmitted over a satellite communication channel to the remote station. In one embodiment, the transceiver logic 204 operates to transmit the status message to the remote station through the communication channel 216.

At block 412, an advisement message is received. For example, in one embodiment, the advisement message is transmitted from a remote station and received by the transceiver logic 204. The transceiver logic 204 then passes the advisement message to the input logic 202. The advisement message confirms a proposed operator action, and/or advises the operator to take selected actions based on the information provided in the status message.

At block 414, the information in the advisement message is displayed to the vehicle operator. For example, the input logic 202 passes information from the advisement message to the display logic 206, which renders the information to the operator via displays, alarms, or indicators.

At block 416, a test is performed to determine if the central station needs more information. For example, the advisement information in the advisement message that is displayed may operate to advise the operator regarding the proposed action and query the vehicle operator to confirm whether or not the operator wants to take the proposed action. For example, the status message may indicate that the operator proposes to end a break period. In response, the advisement message may indicate that it would be advantageous for the operator to continue the break period for an additional amount of time and requests the operator to confirm the proposed action or provide other additional information. If the advisement message requests additional information, the method proceeds to block 402. If no additional information or confirmation is required, the method ends at block 418.

Thus, the method 400 operates to allow a vehicle operator to send status messages and received advisement information from a remote station in accordance with one or more embodiments of an advisement system. It should be understood that the method 400 represents just one implementation and that additions, deletions, combinations, or rearrangement of the functions of the method 400 may be made without deviating from the scope of the embodiments.

Figure 5:
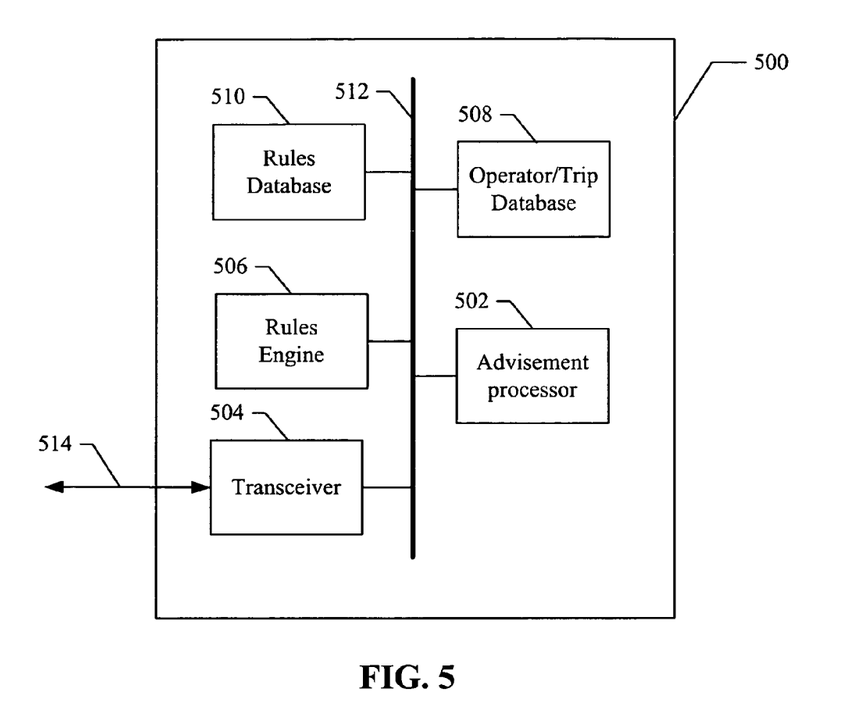
FIG. 5 shows a detailed diagram of one embodiment of advisement logic suitable for use in one or more embodiments of an advisement system.

FIG. 5 shows a detailed diagram of one embodiment of advisement logic 500 suitable for use in one or more embodiments of an advisement system. For example, the advisement logic 500 may be used as the advisement logic 120 shown in FIG. 1.

The advisement logic 500 comprises advisement processor 502, transceiver logic 504, rules engine 506, operator/trip database 508, and a rules database 510 all coupled to an internal data bus 512. It should be noted that the advisement logic 500 represents just one implementation and that other implementations are possible within the scope of the embodiments. For example, the advisement logic 500 could comprise at least one processor configured to perform the functions of an advisement system described herein.

The advisement processor 502 comprises a processor, gate array, CPU, discrete hardware, logic, memory elements, virtual machine, software and/or any combination of hardware and software. Thus, the advisement processor 502 generally comprises logic to execute machine-readable instructions and to control one or more elements of the advisement logic 500.

The transceiver 504 comprises logic configured to communicate over a communication channel 514 using any type of wired and/or wireless technology so that information may be passed between the advisement logic 500 and a remote vehicle. For example, the transceiver 504 may comprise wireless communication logic allowing the transceiver 504 to communicate information though a satellite with an operator I/F located at a remote vehicle.

The operator/trip database 508 comprises any suitable type of database stored in any suitable type of memory that comprises operator and/or trip information. In one embodiment, the operator/trip database 508 comprises operator identifiers, vehicle information, delivery route information, operator status information, trip identifiers, trip start and end data, and/or any other suitable information associated with vehicle operators and/or vehicle trips. For example, the advisement logic 500 receives operator status messages from remote vehicles and stores the information from those messages in the operator/trip database 508. Thus, the operator/trip database 508 comprises a history of the status of one or more vehicle operators and information associated with proposed vehicle trips or planned routes.

The rules database 510 comprises any suitable type of database stored in any suitable type of memory that comprises rules information. For example, the rules information comprises government and/or industry safety regulations pertaining to the management of service hours for vehicle operators. For example, in one embodiment, the rules database 510 contains entries that describe the maximum hours of service per day, maximum hours of service per 60-hour time interval, the number of allowable on-duty hours in a day, and reset time needed resting to "reset" the rule. Virtually any type of rule or regulation may be contained in the rules database 510. In one embodiment, the rules database 510 is periodically updated by the advisement processor 502 to reflect any changes or new regulations.

The rules engine 506 comprises a processor, gate array, CPU, discrete hardware, logic, memory elements, virtual machine, software and/or any combination of hardware and software. The rules engine 506 operates to process information received in a status message to determine whether a proposed operator action is in compliance with rules stored in the rules database 510. For example, the rules engine 506 processes the operator database to determine the history of the operator's action with respect to a selected rule. The rules engine 506 then operates to determine if a rules violation will occur with respect to a proposed operator action. For example, the rules engine 506 can determine from the operator database 508 how long an operator has been on break and determine if returning to an on-duty status will violate any rule. The rules engine 506 may utilize any criteria with which to make determinations about rule compliance.

The advisement processor 502 generates advisements based on information received from the rules engine 506 and/or other information. For example, the advisement processor 502 may consider compliance with regulations, load planning, vehicle efficiency, delivery route efficiency, vehicle position, or any other criteria to generate an advisement message. For example, the advisement logic 502 may access the operator/trip database 508 to determine information about a planned trip or vehicle route. Based on this information, the advisement processor 502 may request rules compliance determinations from the rules engine 506 regarding one or more proposed operator actions. Based on all the information collected by the advisement processor 502, advisement messages are generated. The advisement messages are transmitted to the vehicle through the transceiver 504. In one embodiment, the advisement messages comprise information for display or rendering at the vehicle. The advisement messages may also request additional information so that a proposed operator action can be evaluated.

In one embodiment, the advisement system comprises program instructions stored on a computer-readable media, which when executed by at least one processor, for example, the advisement processor 502, provides the functions as described herein. For example, instructions may be loaded into the advisement processor 502 from a computer-readable media, such as a floppy disk, CDROM, memory card, FLASH memory device, RAM, ROM, or any other type of memory device or computer-readable media. In another embodiment, the instructions may be downloaded into the advisement processor 502 from a network resource through the transceiver 504. The instructions, when executed by the advisement processor, provide one or more embodiments of an advisement system as described herein.

Figure 6:
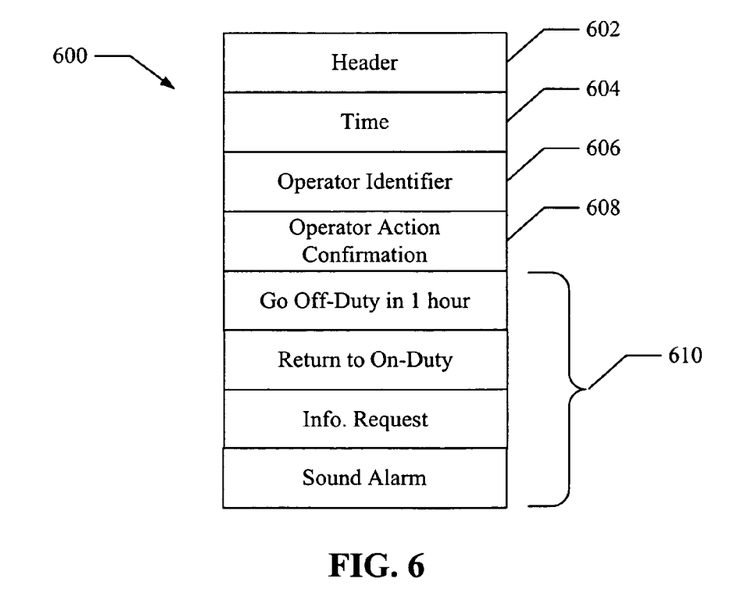
FIG. 6 shows one embodiment of an advisement message suitable for use in one or more embodiments of an advisement system.

FIG. 6 shows one embodiment of an advisement message 600 suitable for use in one or more embodiments of an advisement system. The advisement message 600 comprises a header 602, a time indicator 604, an operator identifier 606, operator action confirmation indicator 608, and one or more advisements 610. It should be noted that the advisement message 600 is just one implementation and that other implementations are possible within the scope of the embodiments.

In one embodiment, the header 602 identifies the message as an advisement message. However, the header 602 may be used to provide any other suitable type of header information. The time indicator 604 indicates a time when the advisement message was created or transmitted. For example, in one embodiment, the time indicator comprises time based on a global time standard. The operator identifier 606 identifies the operator that is associated with the advisement message 600. For example, the operator identifier 606 may be an operator ID number that uniquely identifies the operator.

In one embodiment, the operator action confirmation indicator 608 comprises an indicator that indicates whether a proposed operator action received in an operator status message is confirmed. For example, the confirmation indicator 608 indicates whether or not a proposed operator action in within current safety regulations. The confirmation indicator 608 may also indicate that the operator should consider information that is provided in the advisement 610 before taking any actions.

The advisements 610 comprise one or more recommendations directed to the operator in response to the proposed action provided in a received status message. For example, the advisement 610 may indicate actions the operator should take to comply with safety regulations or to improve the load planning or efficiency of the operation of the delivery vehicle. For example, the advisement 610 may indicate that the vehicle operator should go Off-Duty in one hour or return to On-Duty status. The advisements 610 may also request additional information, or sound a vehicle alarm to alert the vehicle operator regarding a potential compliance violation.

In one embodiment, the advisement processor 502 generates the advisement message 600 in response to information received from the rules engine 506. For example, the rules engine 506 determines whether a proposed operator action is in compliance with safety regulations. The advisement processor 502 processes this information and determines if the operator needs to be advised of one or more actions that can be taken to improve rule compliance, load planning or efficiency of the operation of the delivery vehicle. Thus, the advisements 610 provides information to the vehicle operator about the best course of action to take given the current status and history of the operator, status of the vehicle, current delivery route, or any other condition or parameter relating to the operator or the vehicle.

Figure 7:
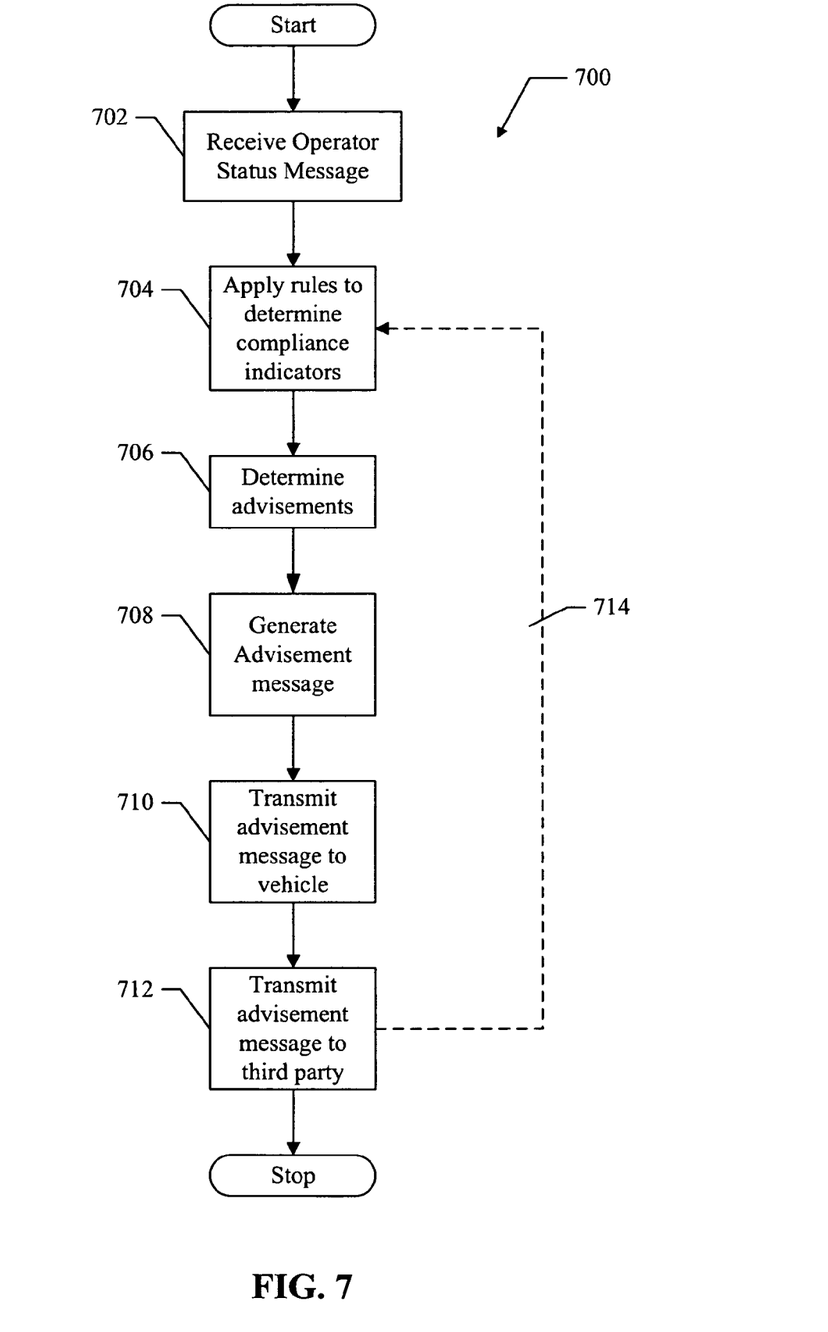
FIG. 7 shows one embodiment of a method for providing one embodiment of an advisement system.

FIG. 7 shows one embodiment of a method 700 for providing one embodiment of an advisement system. For example, the method 700 is suitable for use with the advisement logic 500 shown in FIG. 5. For clarity, the method 700 is described below with reference to the advisement logic 500. In one embodiment, the advisement processor 502 executes machine-readable instructions to control the advisement logic 500 to perform the functions described below.

At block 702, an operator status message is received. For example, the transceiver 504 receives the status message and information in the status message is stored in the operator/trip database 508. In one embodiment, the status message comprises a proposed operator action and the message is formatted as shown in FIG. 3.

At block 704, one or more safety regulations are applied to the proposed operator action to determine one or more compliance indicators associated with the proposed action. For example, the rules engine 506 retrieves regulations from the rules database 510 and applies those regulations to the proposed operator action. In one embodiment, the rules engine 506 also receives a history of operator actions stored in the operator/trip database 508 so that compliance with one or more rules can be determined. For example, the rules may specify selected actions be taken within a given time period and the history of operator actions stored in the operator/trip database 508 is used to determine if the operator is in compliance with those rules. As a result of the operation of the rules engine 506, one or more compliance indicators are generated that are passed to the advisement processor 502.

At block 706, one or more advisements are determined from the proposed operator action. For example, in making advisements, the advisement processor 502 processes the compliance indicators and may also consider related issues, such as load planning, vehicle efficiency, route planning, vehicle position, and/or any other issue relating to the operator or operation of the vehicle. For example, the advisement processor 502 may access the operator/trip database 508 to determine one or more trip parameters that are used to make advisements. A more detailed description of how the advisement system operates at block 706 is provided in another section of this document.

At block 708, one or more advisement messages are generated. For example, in one embodiment, the advisement processor 502 receives one or more compliance indicators from the rules engine 506 and operates to generate an advisement message. For example, the advisement message may be formatted as shown in FIG. 6.

At block 710, the advisement messages are transmitted to the vehicle operator. For example, the advisement processor 502 passes the advisement messages to the transceiver 504, which in turn transmits the advisement messages to the vehicle using the communication channel 514.

At block 712, the advisement message is transmitted to a third party. For example, the advisement processor 502 passes the advisement message to the transceiver 504, which in turn transmits the advisement message to the third party using the communication channel 514. In one embodiment, the third party may be a fleet manager, dispatcher, or any other entity.

Thus, the method 700 operates to allow a vehicle operator to send status messages and received advisement information from a remote station in accordance with one or more embodiments of an advisement system. It should be understood that the method 700 represents just one implementation and that additions, deletions, combinations, or rearrangement of the method 700 may be made without deviating from the scope of the embodiments.

In one embodiment, the advisement system operates in an automatic notification mode so that status messages from a vehicle operator are not required to generate advisement messages. For example, referring to the method 700, an automatic notification path 714 is shown. Embodiments of the advisement system operate to proceed on the automatic notification path 714 from block 712 to block 704 to generate advisement messages at random, periodic, or predetermined times. For example, the method 700 starts at block 704 every day to determine any advisements that may be necessary based on the current information in one or both of the operator/trip database 508 and rules database 510. Thus, the advisement system operates in an automatic mode to generate advisements to assist vehicle operators even if an operator status message has not been received.

Figure 8:
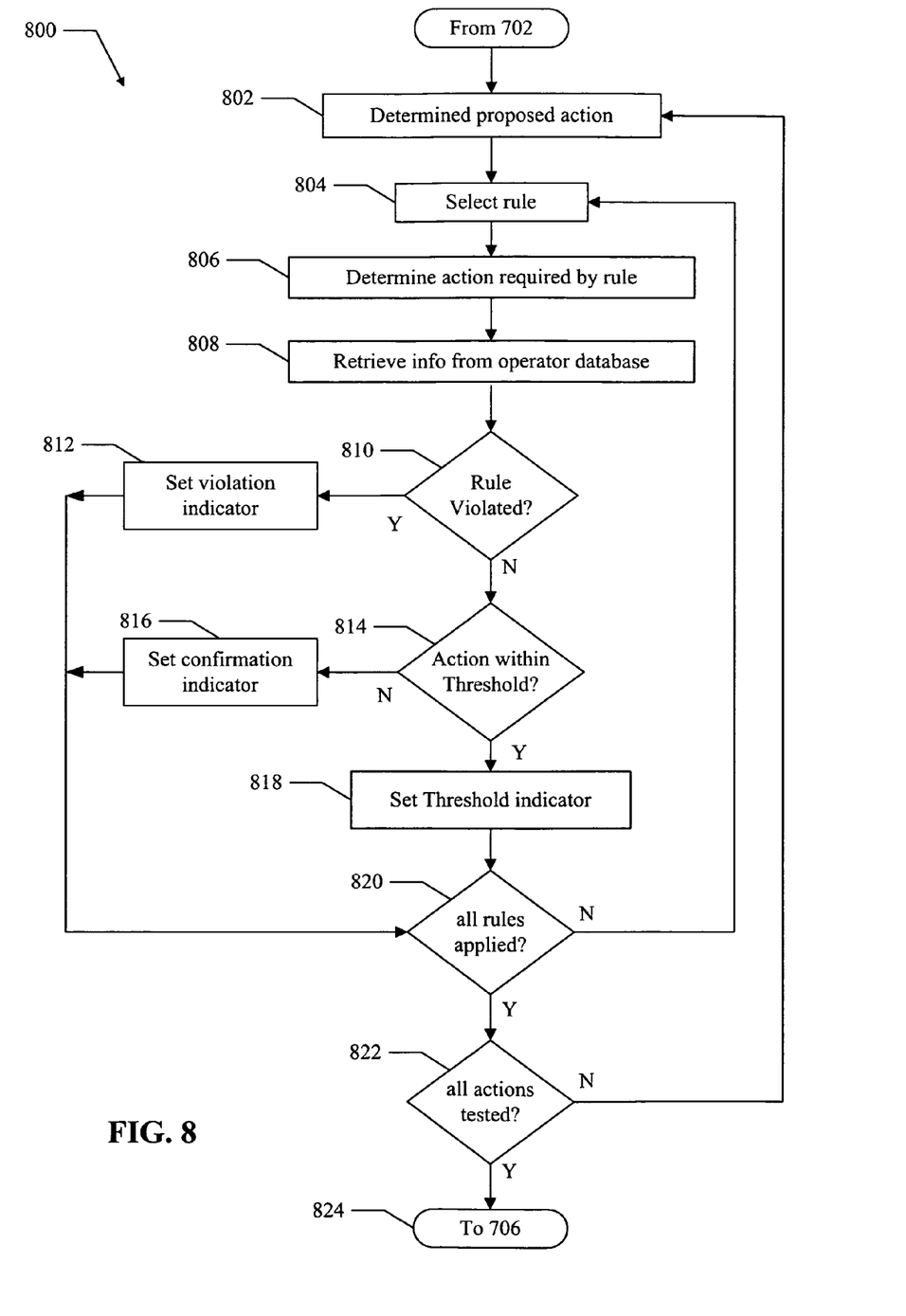
FIG. 8 shows one embodiment of a method for providing one embodiment of an advisement system.

FIG. 8 shows one embodiment of a method 800 for providing one embodiment of an advisement system. For example, the method 800 comprises one embodiment of block 704 shown in FIG. 7, which operates to determine one or more advisements in response to a proposed operator action. For clarity, the method 800 is described below with reference to the advisement logic 500. In one embodiment, the advisement processor 502 executes machine-readable instructions to control the advisement logic 500 to perform the functions described below.

At block 802, a proposed operator action is determined. For example, the proposed operator action is determined from a received status message by the advisement processor 502. However, the proposed operator action in the status message may infer one or more other actions. For example, proposing to end a break period infers that the operator is proposing to go on active status. Thus, in one embodiment, the system operates to consider both proposed and inferred actions.

At block 804, a rule is selected for evaluation. For example, the advisement processor 502 selects a rule with which to evaluate the proposed action and sends a request to the rules engine 506 to evaluate compliance with the selected rule.

At block 806, an action required by the selected rule is determined. For example, the selected rule may regulate the number of hours a vehicle operator can be on-duty in one twenty-four hour time period. In one embodiment, the rules engine 506 determines the required action from the selected rule.

At block 808, information is retrieved from the operator/trip database that relates to the selected rule. For example, if the selected rule relates to operator actions taken over a selected time period, information relating to the operators actions over that time period is retrieved from the operator/trip database. In one embodiment, the rules engine 506 retrieves the necessary information from the operator/trip database 508.

At block 810 a test is performed to determine if the selected rule has been violated. For example, in one embodiment, the rules engine 506 compares the required action of the selected rule to the information obtained from the operator/trip database 508. For example, the required action may be that the operator take a one hour break every twelve hours or driving. The rules engine 506 compares this requirement with information about past operator actions derived from the operator database 508. Thus, the rules engine 506 may determine whether or not the proposed operator action will result in a violation of a required action. If the operator's proposed action would result in a rules violation, the method proceeds to block 812. If the operators proposed action would not result in a rules violation, the method proceeds to block 814.

At block 812, the proposed action by the operator is in violation of the selected rule. For example, the operator is proposing to operate the vehicle longer than is allowed by regulation, or is proposing to miss or reduce break periods required by regulation. In one embodiment, the rules engine 506 operates to set a violation indicator with respect to the rule. The method then proceeds to block 820.

At block 814, a test is performed to determine if the proposed action is within a selected threshold of the selected rule. For example, each rule is assigned a threshold that is included in the rules database 510. If the proposed action comes within the selected threshold of violating the rule, then the rules engine 506 operates to generate an advisement indicator. For example, if the threshold for on duty status is two hours and the proposed operator action is within two hours of violating the on-duty regulation, then an advisement indicator is generated. For example, in one embodiment, the rules engine 506 operates to test the proposed action to determine if it is within the assigned threshold of the selected rule. If the proposed action is not within the assigned threshold, the method proceeds to block 816. If the proposed action is within the assigned threshold, the method proceeds to block 818.

At block 816, a confirmation indicator is set to indicate that the proposed operator action is not within the assigned threshold. For example, the rules engine 506 determined that the proposed action is not within the threshold of violating the selected rule. The rules engine 506 set a confirmation indicator and then proceeds to block 820.

At block 818, a threshold indicator is set to indicate that the proposed operator action is within the assigned threshold of the selected rule. For example, the rules engine 506 determines that the proposed action is within the assigned threshold and sets the threshold indicator. In one embodiment, there are more than one threshold indicators and each threshold indicator is set based on how close the proposed action is to violating the selected rule.

At block 820, a test is performed to determine if all rules have been applied. For example, the advisement processor 502 determines if additional rules need to be applied to the proposed action. If additional rules need to be applied, then the method returns to block 804 to apply the next rule. If all rules have been applied, the method proceeds to block 822.

At block 822, a test is performed to determine if all operator actions have been evaluated. For example, the advisement logic 502 determines the operator actions to be evaluated from the proposed operator actions listed in the status message. In one embodiment, a propose action in the status message infers other actions that need to be tested. For example, a proposed action of ending a break period infers a start of an active duty action. Thus, if more actions need to be tested the method proceeds to block 802. If no other actions need to be tested, the method proceeds to block 706 as shown by block 824.

Therefore, the method 800 operates to determine compliance indicators that comprise violation indicators, confirmation indicators, and threshold indicators that are passed to block 706 of the method 700. For example, at block 706, advisements are generated based on the violation, confirmation, and threshold indicators generated in the method 800. It should be understood that the method 800 represents just one implementation and that additions, deletions, combinations, or rearrangement of the functions of the method 800 may be made without deviating from the scope of the embodiments.

Figure 9:
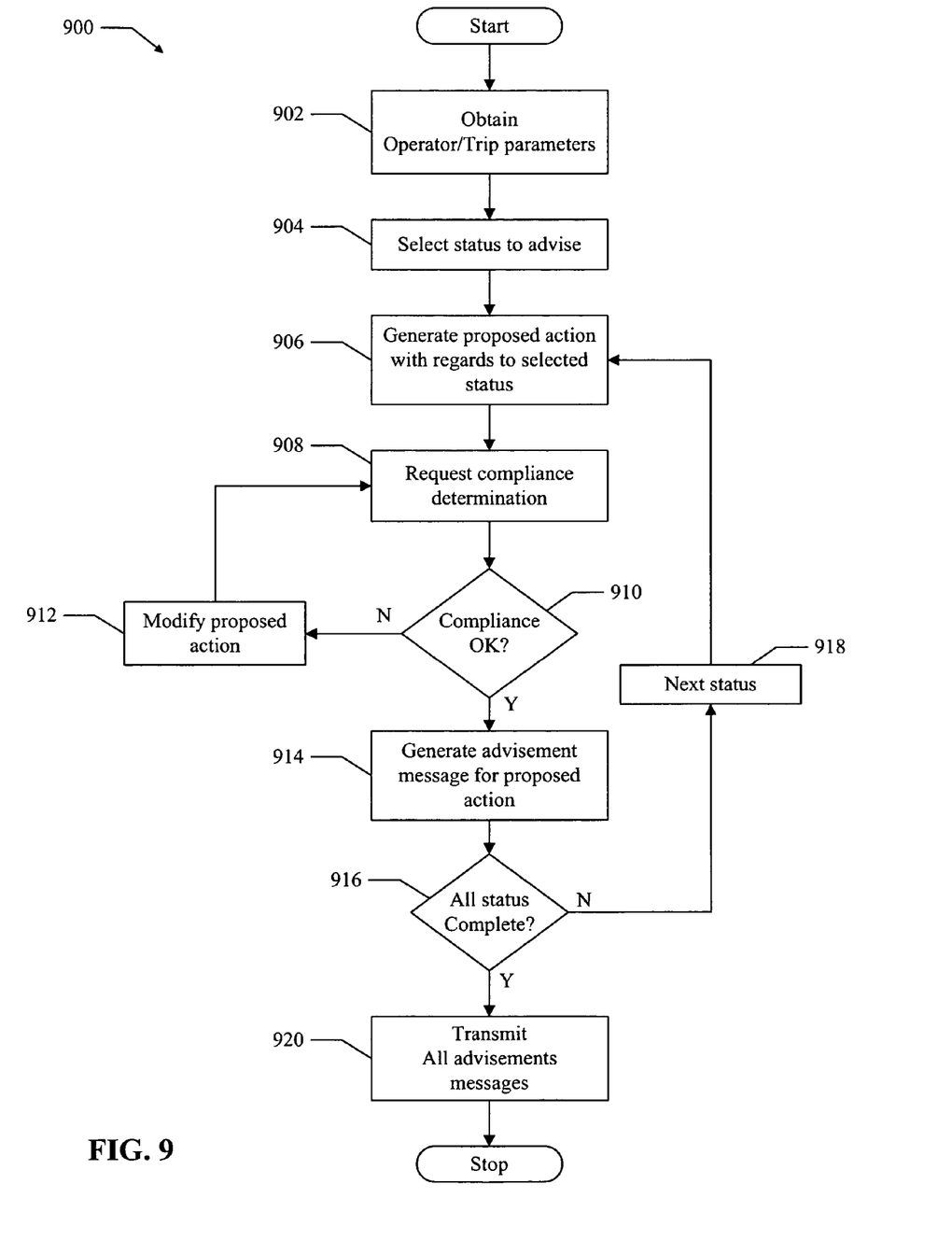
FIG. 9 shows one embodiment of a method for providing one embodiment of an advisement system.

FIG. 9 shows one embodiment of a method 900 for providing one embodiment of an advisement system. For example, the method 900 operates to generate advisement messages based on trip parameters stored in the operator/trip database 508. For clarity, the method 900 is described below with reference to the advisement logic 500. In one embodiment, the advisement processor 502 executes machine-readable instructions to control the advisement logic 500 to perform the functions described below.

At block 902, trip parameters are obtained for a particular vehicle trip. For example, in one embodiment, the trip parameters are obtained by the advisement processor 502 from the operator/trip database 508. The trip parameters describe parameters of a particular vehicle trip, such as overall mileage, number of days, distance to a particular destination, or other trip parameters.

At block 904, an operator status is selected with which to advise the operator. For example, the operator status may be the On-Duty status, the Off-Duty status, or any other operator status. In one embodiment, the advisement processor 502 selects the status to which an advisement is to be generated.

At block 906, a proposed operator action is generated with respect to the selected status. For example, if the selected status is the On-Duty status, the proposed operator action may be a proposed number of On-Duty hours the operator should perform over the course of the trip. In one embodiment, the advisement logic 502 operates to propose the operator action. For example, the proposed operator action may be derived from pre-stored information that is intended to produce the most efficient operation of the vehicle over the course of the trip.

At block 908, a request for a compliance determination is made. In one embodiment, the advisement processor 502 requests the compliance determination from the rules engine 506. For example, the advisement processor 502 transmits a request for a rules determination that includes the proposed action for the trip.

At block 910, a compliance test is performed to determine if the proposed action complies with safety regulations. In one embodiment, the rules engine 506 operates to determine if the proposed action complies with existing safety regulations and transmits its results to the advisement processor 502. For example, the rules engine 506 obtains information from the rules database to determine if the proposed action complies with the regulations. If the proposed action complies with the regulations, the method proceeds to block 914. If the proposed action does not comply with the regulations, the method proceeds to block 912.

At block 912, the proposed action is modified. For example, the proposed number of On-Duty hours may be reduced or otherwise changed. In one embodiment, the advisement processor 502 modifies the proposed action. The method then proceeds to block 908 where another compliance determination is made.

At block 914, an advisement message is generated based on the proposed action. In one embodiment, the advisement processor 502 generates an advisement messages that indicates the proposed action for the operation with regards to the selected status. For example, the advisement message may advise the operator about the number of On-Duty hours that are acceptable for the trip under the existing safety regulations.

At block 916, a test is performed to determine if advisements have been generated for all operator status conditions. In one embodiment, the advisement processor 502 determines if there are additional operator status conditions that require advisements. For example, it may be determined that an advisement is required for the proposed trip with respect to the Off-Duty status condition. If additional advisements are needed, the method proceeds to block 918. If no other advisements are needed, the method proceeds to block 920.

At block 918, the next status condition is selected for which an advisement for the selected trip will be generated. In one embodiment, the advisement processor 502 selects the next status condition for which an advisement will be generated. For example, the next status condition may be the Off-Duty status. The method then proceeds to block 906 where a proposed action for that status condition is generated.

At block 920, all generated advisement messages are transmitted to the vehicle operator. In one embodiment, the advisement processor 502 passes the advisement messages to the transceiver logic 504 which then transmits the messages to the operator through the communication link 514. For example, advisement messages for On-Duty hours and Off-Duty hours for the selected trip may be generated, and these messages are transmitted to the vehicle operator by the transceiver logic 504.

Therefore, the method 900 operates to determine one or more advisements for a vehicle operator with respect to a proposed vehicle trip. Any aspect of the vehicle trip may be used to generate the advisement messages. As a result, the advisements can be used by the vehicle operator to operate the vehicle in compliance with the safety regulations, while achieving selected operational priorities. For example, the advisements may advise the vehicle operator as to obtaining the maximum On-Duty hours within the safety regulations. It should be understood that the method 900 represents just one implementation and that additions, deletions, combinations, or rearrangement of the functions of the method 900 may be made without deviating from the scope of the embodiments.

Therefore, an advisement system that operates to provide hours of service management for vehicle operators has been described herein. Accordingly, while one or more embodiments have been illustrated and described, it will be appreciated that various changes can be made to the embodiments without departing from their spirit or essential characteristics. Therefore, the disclosures and descriptions herein are intended to be illustrative, but not limiting, of the scope of the invention, which is set forth in the following claims.

We claim:

1. A method for providing advisements to a vehicle operator, the method comprising:
   receiving a status message in a transmission from a vehicle, wherein the status message indicates a status parameter and a proposed action;
   determining a compliance indicator associated with the status parameter, wherein the compliance indicator is selected from at least one of confirmation, violation, and/or threshold indicators;
   generating an advisement message based at least in part on the compliance indicator and the proposed action; and
   transmitting the advisement message to the vehicle.

2. The method of claim 1, wherein the status parameter comprises an operator status indicator.

3. The method of claim 1, wherein the status parameter comprises one or more trip parameters.

4. The method of claim 1, wherein said determining further comprises processing operator history information to determine the compliance indicator.

5. The method of claim 1, further comprising:
   determining a plurality of compliance indicators based at least in part on the status parameter; and
   generating the advisement message based at least in part on the plurality of compliance indicators.

6. The method of claim 1, wherein the advisement message comprises an advisement regarding an impact of the proposed action.

7. Apparatus for providing advisements to a vehicle operator, the apparatus comprising:
   receiving logic adapted to receive a status message in a transmission from a vehicle, wherein the status message indicates a status parameter and a proposed action;
   a rules engine adapted to determine a compliance indicator associated with the status parameter, wherein the compliance indicator is selected from at least one of confirmation, violation, and/or threshold indicators;
   an advisement processor configured to generate an advisement message based at least in part on the compliance indicator and the proposed action; and
   transmitting logic adapted to transmit the advisement message to the vehicle.

8. The apparatus of claim 7, wherein the status parameter comprises an operator status indicator.

9. The apparatus of claim 7, wherein the status parameter comprises one or more trip parameters.

10. The apparatus of claim 7, wherein said rules engine operates to process operator history information to determine the compliance indicator.

11. The apparatus of claim 7, wherein said rules engine further comprises:
    logic adapted to determine a plurality of compliance indicators based at least in part on the status parameter, and
    logic adapted to generate the advisement message based at least in part on the plurality of compliance, indicators.

12. Apparatus for providing advisements, to a vehicle operator, the apparatus comprising:
    means for receiving a status message in a transmission from a vehicle, wherein the status message indicates a status parameter and a proposed action;
    means for determining a compliance indicator associated with the status parameter, wherein the compliance indicator is selected from at least one of confirmation, violation, and/or threshold indicators;
    means for generating an advisement message based at least in part on the compliance indicator and the proposed action; and
    means for transmitting the advisement message to the vehicle.

13. The apparatus of claim 12, wherein the status parameter comprises an operator status indicator.

14. The apparatus of claim 12, wherein the status parameter comprises one or more trip parameters.

15. The apparatus of claim 12, wherein said means for determining further comprises means for processing operator history information to determine the compliance indicator.

16. The apparatus of claim 12, further comprising:
    means for determining a plurality of compliance indicators based at least in part on the status parameter; and
    means for generating the advisement message based at least in part on the plurality of compliance indicators.

17. A computer-readable media comprising instructions, which if executed by at least one processor, provide advisements to a vehicle operator, the computers-readable media comprising:
- instructions for receiving a status message in a transmission from a vehicle, wherein the status message indicates a status parameter and a proposed action;
- instructions for determining a compliance indicator associated with the status parameter, wherein the compliance indicator is selected from at least one of confirmation, violation, and/or threshold indicators;
- instructions for generating, an advisement message based at least in part on the compliance indicator and the proposed action; and
- instructions for transmitting the advisement message to the vehicle.

18. The apparatus of claim 17, wherein the status parameter comprises an operator status indicator.

19. The apparatus of claim 17, wherein the status parameter comprises one or more trip parameters.

20. The apparatus of claim 17, wherein said instructions for determining further comprise instructions for processing operator history information to determine the compliance indicator.

21. The apparatus of claim 17, further comprising:
- instructions for determining a plurality of compliance indicators based at least in part on the status parameter; and
- instructi6ns for generating the advisement message based at least in part on the plurality of compliance indicators.

22. An apparatus comprising: at least one processor adapted to perform a method for providing advisements to a vehicle operator, the method comprising:
- receiving a status message in a transmission from a vehicle, wherein the status message comprises a status parameter and a proposed action;
- determining a compliance indicator associated with the status parameter, wherein the compliance indicator is selected from at least one of confirmation, violation, and/or threshold indicators;
- generating an advisement message based at least in part on the compliance indicator and the proposed action; and
- transmitting the advisement message to the vehicle.

23. The apparatus of claim 22, wherein the status parameter comprises an operator status indicator.

24. The apparatus of claim 22, wherein the status parameter comprises one or more trip parameters.

25. The apparatus of claim 22, wherein said determining further comprises processing operator history information to determine the compliance indicator.

26. The apparatus of claim 22, further comprising:
- determining a plurality of compliance indicators based at least in part on the status parameter; and
- generating the advisement message based at least in part on the plurality of compliance indicators;

27. A method for providing advisements to a vehicle operator, the method comprising:
- obtaining a status parameter and a proposed action;
- determining a compliance indicator associated with the status parameter, wherein the compliance indicator is selected from at least one of confirmation, violation, and/or threshold indicators;
- generating an advisement message based at least in part on the compliance indicator and the proposed action; and
- displaying the advisement message.

28. The method of claim 27, wherein the status parameter comprises an operator status indicator.

29. The method of claim 27, wherein the status parameter comprises one or more trip parameters.

30. The method of claim 27, wherein, said determining further comprises processing operator history information to determine the compliance indicator.

31. The method of claim 27, further comprising:
- determining a plurality of compliance indicators based at least in part on the status parameter; and
- generating the advisement message based at least in part on the plurality of compliance indicators.

32. Apparatus for providing advisements to a vehicle operator, the apparatus comprising:
- logic adapted to obtain a status parameter and a proposed action;
- a rules engine adapted to determine a compliance indicator associated with the status parameter, wherein the compliance indicator is selected from at least one of confirmation, violation, and/or threshold indicators;
- an advisement processor adapted to generate an advisement message based at least in part on the compliance indicator and the proposed action; and
- display logic configured to display the advisement message.

33. The apparatus of claim 32, wherein the status parameter comprises an operator status indicator.

34. The apparatus of claim 32, wherein the status parameter comprises one or more trip parameters.

35. The apparatus of claim 32, wherein said rules engine operates to process operator history information to determine the compliance indicator.

36. The apparatus of claim 32, wherein said rules engine further comprises:
- logic adapted to determine a plurality of compliance indicators based at least in part on the status parameter; and
- logic adapted to generate the advisement message based at least in part on the plurality of compliance indicators.

37. An article comprising a storage medium comprising machine-readable instructions stored thereon which, if executed by a processor, are adapted to enable said processor to:
- receive a status message in a transmission from a vehicle, wherein the status message indicates a status parameter and a proposed action;
- determine a compliance indicator associated with the status parameter, wherein the compliance indicator is selected from at least one of confirmation, violation, and/or threshold indicators;
- generate an advisement message based at least in part on the compliance indicator and the proposed action; and
- transmit the advisement message to the vehicle.

38. The article of claim 37, wherein the advisement message comprises an advisement regarding an impact of the proposed action.

39. The article of claim 37, wherein said machine-readable instructions, if executed by said processor, are further adapted to enable said processor to:
- determine a plurality of compliance indicators based at least in part on the status parameter; and
- generate the advisement message based at least in part on the plurality of compliance indicators.

* * * * *

UNITED STATES PATENT AND TRADEMARK OFFICE
CERTIFICATE OF CORRECTION

PATENT NO. : 7,616,105 B2  Page 1 of 1
APPLICATION NO. : 11/370600
DATED : November 10, 2009
INVENTOR(S) : Macielinski et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 329 days.

Signed and Sealed this

Nineteenth Day of October, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,616,105 B2 |
| APPLICATION NO. | : 11/370600 |
| DATED | : November 10, 2009 |
| INVENTOR(S) | : Macielinski et al. |

It is certified that error appears in the above-identified patent and that said Letters Patent is hereby corrected as shown below:

Column 16, line 40, claim 11: "compliance, indicators" to read as --compliance indicators--

Column 16, line 41, claim 12: "advisements, to" to read as --advisements to--

Column 17, line 3, claim 17: "computers-readable" to read as --computer-readable--

Column 17, line 12, claim 17: "generating, an advisement" to read as --generating an advisement--

Column 17, line 28, claim 21: "instructi6ns" to read as --instructions--

Column 18, line 5, claim 30: "wherein, said" to read as --wherein said--

Signed and Sealed this
Seventeenth Day of May, 2011

David J. Kappos
*Director of the United States Patent and Trademark Office*